United States Patent Office
2,970,060
Patented Jan. 31, 1961

2,970,060

BUILDING UNITS AND METHOD OF PRODUCING THE SAME

William H. Burnett, 14 W. 1st St., Hutchinson, Kans.

No Drawing. Filed Oct. 3, 1957, Ser. No. 688,097

12 Claims. (Cl. 106—71)

This invention relates to the building arts and, more particularly, to a method of producing a ceramic building unit having high strength to weight characteristics, as well as to a fired ceramic unit made in accordance with the novel process hereof.

The most important object of the present invention is the provision of a method of producing an inexpensive building unit which is lightweight, has high compressive strength characteristics, and may be constructed of materials readily available, wherein the unit is fired at a predetermined temperature so as to produce a true ceramic unit which does not warp, shrink or crack during firing thereof.

Also an important object of the present invention is to provide a method of producing a unit as described wherein materials are utilized which sinter during the firing process to thereby permanently bond the particles of aggregate used together and present a composite unit which has high insulating characteristics, and which may be utilized to fabricate various structures through the use of conventional mortars or the like.

Another important object of the invention is to provide a method of producing a building unit wherein bentonite is utilized to initially impart sufficient plasticity and cohesion to the moist particles of aggregate so that the same may be readily molded into a relatively self-sustaining unit prior to firing thereof and to subsequently act as a binder for the particles of aggregate upon sintering of the bentonite during firing of the unit.

An important object of the invention also relates to the provision of a method of producing a building unit as set forth above wherein a pre-fired, vesicular volcanic ash material is incorporated into the admixture prior to molding and firing thereof, and which has a fusion temperature approximating that of the bentonite so that the volcanic material also sinters during sintering of the bentonite to provide additional bonding material for permanently tacking the particles of aggregate together upon completion of the firing process.

Other important objects of the invention include the provision of a method of producing a building block formed of an admixture of bentonite, a volcanic ash, and pre-fired, bloated shales, which are molded into a suitable shape and then fired at a temperature sufficient only to sinter the bentonite and volcanic material and thereby permanently bond the particles of the bloated aggregate together; to the provision of a method referred to above wherein a fluxing agent is added to the admixture of materials to lower the fusion points of the bentonite and the volcanic material and thereby permit the utilization of pre-fired, bloated aggregates having fusion points closer to the bentonite and the volcanic ash than would ordinarily be possible in the present method; to the provision of a process of producing a building unit wherein a plasticizing agent is incorporated into the admixture of materials to prevent cracking of the unit during molding thereof and prior to firing of the same; to the provision of a fired ceramic building unit having high strength to weight characteristics constructed in accordance with the novel process hereinabove outlined; to the provision of an improved product and method of producing the same as disclosed in my applications, Serial No. 363,946, filed June 24, 1953, and Serial No. 506,373, filed May 5, 1955, both filed under the title of "Building Block and Method of Producing the Same," and now abandoned, and of which the present application is a continuation-in-part; and to other objects and details of the present invention which will become obvious as the following specification progresses.

Briefly, the present invention involves admixing predetermined proportions of a bentonite capable of swelling in the presence of water, a finely divided, pre-fired, vesicular volcanic ash material, a particulate, pre-fired, bloated clay, shale, slag or admixtures thereof; thoroughly agitating the admixture of dry substances; introducing a sufficient quantity of water into the dry admixture to produce a moist, moldable mass; molding the mass into a predetermined shape or unit; drying the molded unit to substantially remove all of the moisture therefrom; and subsequently firing the dried unit at a temperature sufficient only to sinter the bentonite and the volcanic material and thereby permanently bond the particles of aggregate together to present a ceramic unit of high compressive strength and low coefficient of expansion.

The first step of the present method contemplates thoroughly admixing a predetermined proportion of bentonite capable of swelling in the presence of water with a quantity of a pre-fired, finely divided, vesicular volcanic ash material and then adding these two substances to a predetermined amount of a particulate ceramic aggregate consisting of a pre-fired, bloated clay, shale or slag. The bentonite and the volcanic ash admixture may be conveniently referred to as the bonding fraction, while the pre-fired bloated clays, shales and slags will be termed particulate aggregates in the description following. After thorough mixing of the dry materials, sufficient water is added to present a moist, relatively tacky mass which may be molded into suitable shapes in a conventional molding machine or a vibration press.

The bentonite which is utilized as a part of the bonding fraction in production of the present building unit has two important functions during production of the unit. The bentonite, because of its ability to absorb water and thereby swell, operates to form a substantially tacky mass when water is added to the dry admixture and to impart sufficient cohesion to the mass that the same may be molded in a conventional manner as to be hereinafter described, and to retain its shape after removal from the mold and until the moisture contained therein has been removed by a drying process. Subsequently, during firing of the unit at a predetermined temperature which is sufficient to sinter the bentonite and not the aggregate, the sintered bentonite tacks the particles of aggregate together and thereby cooperates with the volcanic material referred to above to present a composite ceramic unit having the desired properties. The bentonite which is suitable for the present process is a finely divided material composed mainly of clay minerals of the montmorillonite group, and is generally formed by the devitrification and accompanying chemical alteration of a glassy, igneous material, usually a tough or volcanic ash. Bentonites of the swelling type which expand to several times their original volume when in contact with water will remain in suspension in water and form a gel when allowed to set and form a colloidal type of suspension. The main constituent of swelling bentonite, montmorillonite, falls into that group of clay minerals which include the following: montmorillonite (hydrous aluminum silicate), beidellite (hydrous aluminum silicate), saponite (hydrous iron-aluminum silicate), montronite (hydrous iron-aluminum silicate), and hectorite (hydrous magnesium-lithium silicate). These minerals vary in composition principally by the exchange of sodium and calcium atoms for the other elements normally present, and this accounts for their swelling characteristics in the presence of water. For example, the crystal structure of the montmorillonite group consists of two silicon-oxygen sheets with an aluminum-oxygen sheet sandwiched therebetween. When water molecules enter between adjacent sheets of the sodium bentonite crystal, the lattice structure of the bentonite molecule expands in one direction and the bentonite swells, some varieties of bentonite swelling up to over twenty times their original volume. The expansive property of the lattice seems to be related to the exchangeable atoms, sodium and calcium, it having been found that the presence of sodium favors extreme swelling, whereas exchangeable calcium somewhat reduces the swelling ability of the particular bentonite.

Bentonite, depending upon the amount of impurities present, loses most of its colloidality (its ability to form a colloid in water) at temperatures ranging from 700° F. to 1500° F. Most of the relatively pure bentonites, which are especially operable in the present invention, swell to approximately sixteen times their original volume in the presence of water and lose their colloidality at approximately 1300° F.

The pre-fired, finely divided, vesicular volcanic material which is admixed with the bentonite described above to present a bonding fraction, is preferably a volcanic ash which has been fired in the volcano and which has a fusion temperature or point approximating that of bentonite. The volcanic ash may be fired again by artificial means if desired to present a vesicular material. The most suitable volcanic materials have been found to be pumicite, pumice, an artificially expanded pumicite known commercially by the name exfoliated pumicite and, for some applications, pearlite. The pre-firing or exfoliation of the volcanic material occurred naturally in the volcano, or additionally carried out artificially in a suitable furnace. The magmatic water which was originally contained in the volcanic ash material is driven off under influence of the heat either in the volcano or the furnace, thus leaving a round, expanded particle many times the original size and of light weight. The preferred material of the present invention, pumicite, is usually sufficiently finely divided in the condition the same comes from the point of mining that the material may be used without further grinding or the like, and usually will pass through a 325 mesh screen with particles of various gradations. The importance of the various gradations of particle size in the pumicite will be set forth more fully hereinafter. Deposits of pumicite or volcanic ash are found principally in Texas, Oklahoma, Kansas, Nebraska and California and most usually begin to fuse at approximately 1600° F. Because the particle size of the volcanic ash will vary from extremely fine to the larger particles which pass through the screen size defined above, the actual fusion temperature of the volcanic material ranges from as low as 1300° F. up to approximately 2200° F. The 1600° F. fusion temperature of the volcanic ash specified above is a mean temperature at which most of the particles in a representative sample will begin to fuse. The very smallest particles fuse at a lower temperature than the larger particles because of the fact that heat more readily penetrates into the same and thus, the same will tend to fuse at a much faster rate and at a lower temperature. An analysis of two kinds of pumicite is set forth in the following table, the raw volcanic ash being specified in the first column while the second column contains the analysis of an artificially exfoliated variety of pumicite:

|  | Raw Volcanic Ash, percent | Exfoliated Material, percent |
| --- | --- | --- |
| Loss on ignition | 4.25 | 1.73 |
| Silica | 76.65 | 76.25 |
| Alumina | 13.15 | 13.94 |
| Iron | 1.23 | 1.69 |
| Calcium oxide | 0.45 | 1.43 |
| Magnesium oxide | 0.06 | 0.10 |
| Sulfur trioxide | 0.10 | 0.13 |
| Alkalies | 4.21 | 4.73 |
|  | 100.00 | 100.00 |

Particulate aggregates which are most suitable for the present process, are those known commercially as pre-fired, bloated shales, clays, slags and volcanic rocks which have been expanded under the action of heat. These vesicular bloated clays, shales, slags and volcanic rocks are to be distinguished from the pre-fired volcanic material referred to above and are usually of larger particle size than the volcanic ash material and have a considerably higher fusion temperature. The clays, shales and slags referred to have most usually been bloated at a temperature between 2000° and 3000° F. and thus, have a fusion temperature considerably in excess of the bentonite and the volcanic ash material. The bloated substances, whether found in a boated condition naturally or expanded artificially in rotary kilns or the like, usually are in a clinker state and thus, must be reduced to a suitable size by grinding. Materials which have been found to be utilizable in the present invention include boated shales, the preferred one being "Haydite," marketed by the Carter-Waters Corporation, Kansas City, Missouri, scoria, a bloated volcanic rock material found in various areas including New Mexico, similar bloated clay materials, and vesicular blast furnace slags which are a by-product of the production of iron and similar metals. These aggregates all have median fusion temperatures in excess of 2000° F. and are well suited for production of lightweight building units having high compressive strength. The particulate aggregate is also most usually commercially available in a form wherein the particles are of different sizes and thus, the material is said to have a specified gradation. The gradation which is most suitable for the present process is that set up by the cement block manufacturing industry as a standard for aggregates used in the production of cement blocks. This standard specifies that 70% of the material must pass through a ¼ inch screen size while 30% must pass through a ⅜ inch screen. Manifestly, this gradation also contains a quantity of particles which are known as fines and which will vary somewhat according to the time of grinding and the equipment utilized. As pointed out previously with respect to the pre-fired volcanic material such as pumicite, which also ordinarily contains fines, the very fine particles of aggregate fuse at a somewhat lower temperature than the larger particles of the same. The reason for this is, again, the fact that the fine particles more readily receive the heat than the larger particles and tend to melt or fuse at a lower temperature.

An example of a preferred building unit made in accordance with the concepts of the present invention is set forth below. All of the ingredients are calculated as parts by weight of the dry ingredients.

|  | Lbs. |
| --- | --- |
| Bentonite (Wyoming deposit) | 2 |
| Pumicite | 4 |
| Scoria | 94 |
| Water | 10 |
| Borax | 0.5 |
| Polyfon T | 0.2 |

The initially dry ingredients, namely, the bentonite, the pumicite and the scoria are initially admixed in a dry state in any suitable agitator such as a rotary mixer or the like, preferably containing a mixing arm, and after thorough mixing of the substances, the water is added and mixing of the substances continued until a moist, substantially homogeneous, moldable mass is obtained. The moist mass which is somewhat tacky is then removed from the mixer and is in condition for immediate molding. This molding operation is most commonly performed in either one of two types of machines and the type employed will vary with the physical characteristics which the block must possess. For example, if it is desired that the block have maximum compressive strength, the moist mass may be molded in a standard compression molding machine utilized widely in the brick and clay industry for producing bricks and blocks of high compressive strength. Utilizing a compression molding machine to mold the mass into units the size and shape of a standard brick, it was determined that after drying and firing, a building unit molded under a pressure of 3000 lbs. per square inch gave a compressive strength test of over 8000 lbs. per square inch when subjected to standard testing procedures. A building unit made in accordance with this procedure weighs substantially less than an ordinary brick, yet retains the same or greater compression constants than standard "A" bricks utilizing brick clays.

However, if it is desired to form a building unit which is of light weight and yet retains compression constants equal to or better than similar cement blocks, the moist mass produced above may be molded in commercially available, vibration machines which are presently commonly employed in the cement block industry. Blocks produced by molding in a vibration machine and suitably fired at temperatures to be hereinafter described gave compression tests of in excess of 1000 lbs. per square inch. The exact pressure to which the building unit is subjected during molding will vary with the circumstances and ranges from approximately 5 lbs. per square inch in a vibrating machine to over 15,000 lbs. per square inch in a mechanical or hydraulic press. Ordinarily, the type of building unit desired with respect to density and size will dictate the molding machine which is used, lightweight, relatively porous building units being formed in the vibrating machine while substantially nonporous, dense units are constructed in the presses.

After molding of the moist mass into the desired shape of the prescribed size, the formed blocks are then placed on pallets or the like and passed through a suitable drying oven. It should be pointed out that the Polyfon T set forth in the example above is a plasticizing agent produced by West Virginia Pulp and Paper Company, Charleston, South Carolina, and operates to materially increase the green strength of the molded unit both before drying and after drying thereof. Various glues and organic binders are utilizable in place of the Polyfon T but the latter has been found to give the best results for the intended purposes and effectively prevents cracking of the molded blocks or bricks between the time the same are removed from the mold, passed through the drying oven and then directed into the kilns. Polyfon T is a sodium lignosulfonate derived from alkali lignin. The proportion of Polyfon T or other suitable plasticizing agents may vary but it is preferred from both technical and economical aspects to limit the plasticizing agent to an amount within the range of 0.1% to 0.2% by weight of the admixture.

Drying of the formed units may be effected either in a kiln of the type wherein the pallets are placed upon carts and passed longitudinally therethrough from one end to the other, or the same may be dried in ovens wherein the pallets are pushed through an opening in the oven, allowed to dry and then removed from the same opening. The temperature within the drying oven need only be sufficient to completely dry the building units within a practical length of time, but it has been found that passing the units through an elongated oven having an entrance at one end thereof and an outlet at the other end thereof is the most satisfactory from a commercial standpoint and materially lessens the cost of the overall operation. The maximum temperature within the drying oven should be approximately 400° F., but it has also been determined that maintenance of the oven at a range within 200° to 250° F. will produce satisfactory results at a lower cost, inasmuch as it is not necessary to maintain the oven at the higher temperature of 400° F. If continuous drying through an elongated oven is employed, passage of the formed units through an oven maintained at 400° F. for a period of 10 hours has been found sufficient to remove substantially all of the moisture from the formed units. The drying operation should be controlled to such an extent as to remove all of the water from the blocks without causing fissures and cracks in the same by virtue of the water being changed to steam under influence of the heat in the oven and attempting to escape from the solid components of the block at too fast a rate. By maintaining the oven within the prescribed ranges, it has been found there is little or no danger of steam being produced which would deleteriously affect the formed building units. Complete drying of the building units in a suitable oven causes the dried blocks to have sufficient green strength to be handled because of the hydraulic bond which is created during evaporation of the water from the formed blocks and the suction thereby produced which holds the grains of material together and maintains them in the desired shape until they have been permanently bonded together during the firing cycle.

After the blocks have been completely dried within the drying oven, the same are conducted to a suitable firing kiln. Since the blocks may be readily handled after drying thereof, it is most usually the most practical method to remove the building units from the pallets upon which the same were initially disposed and stack the dry blocks on suitable kiln carts. These kiln carts containing the stacked blocks, which may be from 20 to 25 layers high, are then pushed into a kiln at the specified temperature. Again it is to be noted that an elongated kiln having an entrance and an outlet is the most desirable type of structure, inasmuch as a continuous operation may be maintained as kiln carts are uninterruptedly moved into the kiln, moved therethrough at a preselected rate, and subsequently removed from the kiln at the opposite end thereof. The temperature within the kiln will depend upon the particular materials employed, as well as the end product desired and, at the outset, it is initially pointed out that the firing temperature should be sufficient to sinter the bentonite and the volcanic ash material but not sufficient to fuse or melt the larger particles of aggregate. With respect to the example set forth above, a block of over 1000 lbs. per square inch compressive strength and a brick of over 8000 lbs. per square inch of compressive strength were produced by subjecting the building units to a temperature of approximately 1975° F.

By raising the temperature of the building unit within the kiln to a temperature sufficient to sinter only the bentonite and the finely divided volcanic material, such as pumicite, and not the main proportion of the particles of aggregate, permanent bonding of the particles of aggregate together is obtained and a strong, lightweight building unit is produced which has a low coefficient of expansion and does not warp, crack or shrink during firing. Raising the temperature of the building units to the sintering point of the bentonite and the volcanic ash causes the same to become a coherent, solid mass without thoroughly melting and thus, the block retains its original shape throughout the firing process and does not warp or shrink. The exact sintering temperature of the bentonite and volcanic ash will vary depending upon the materials employed and the degree of division of particles of aggregate, as well as the bonding substances. As heretofore pointed out, the particle size of the aggregate and volcanic ash vary and thus, the small particles or fines, as they are known, more readily receive the heat than do the larger particles and tend to fuse or sinter at a lower temperature than the larger particles of the admixture. It is believed that the bentonite and volcanic ash form a eutectic mixture and that the sintering point of these substances is somewhat below the fusion temperature of each individual material. In this case, the fines of aggregate also contribute to the lowering of the fusion temperature of the bentonite and volcanic ash and tend to sinter with the bentonite and pumicite to permanently bond the larger particles of aggregate together. This eutectic phenomenon is of importance because the unit may be raised to the sintering temperature of the bentonite, volcanic ash and fines of the aggregate to permanently bond the larger particles of aggregate together without the necessity of raising the building unit to an elevated temperature which would tend to fuse, melt or sinter the larger particles of aggregate. In this way, warping and shrinkage of the unit is prevented during the firing procedure.

The exact temperature at which the building unit should be fired will vary as set forth above, but it has been determined that the most advantageous and efficient firing of the units may be effected in an elongated kiln of the type wherein kiln carts are loaded with building units and slowly advanced through the kiln at a predetermined rate. The optimum time in which the building units should remain within the kiln during advancement of the same therethrough has been found to be approximately 13½ hours, with the maximum temperature at the center of the kiln maintained within the range of 1800° to 2000° F. The most successful range has been determined to be within 1865° to 1975° F., while the time at which the building units are subjected to this maximum temperature will vary from 1 to 2 hours. It is to be noted that the sintering temperature of the admixture of bentonite, volcanic ash and fines of the aggregate is well below that of the larger particles of pre-fired, bloated clays, shales and slags. Another important advantage of utilizing bonding agents such as bentonite and volcanic ash to permanently tack the particles of aggregate together is the fact that by utilization of these materials, there is no breakdown of the building unit during the firing process because of the sintering of the bonding fraction. Although the bentonite loses its colloidality at a temperature somewhat below its sintering point, it is pointed out that this does not cause the block to crumble and fall apart before the bentonite and volcanic ash have sintered because the bentonite gradually loses its colloidality from the surface toward the center thereof and thus, breakdown of the block is effectively prevented. In other words, the bentonite in the outer portion of the block loses its colloidality first because the heat has not penetrated sufficiently into the block to raise the center thereof to the point where the bentonite in the center portion loses its colloidality, until the bentonite in the outer surface of the block has reached its sintering temperature, whereupon the inner portion of the block then is raised to a temperature where the bentonite therein loses its colloidality. This gradual process of the bentonite initially losing its colloidality and then being raised to its sintering point operates to prevent warping and shrinkage of the block during the firing and is a major reason for the success of the present building units. Another factor which contributes to prevention of breakdown of the block during the firing cycle is the fact that the volcanic ash sinters within a range rather than at a specified temperature. Thus, a portion of the volcanic ash sinters before other parts of the same and tacks the particles of aggregate together before there is any tendency of the same to break down and fall apart during the firing process.

The borax included in the preferred example set forth above operates as a fluxing agent during sintering of the bentonite and volcanic ash material and thus lowers the point at which the same become a coherent mass under the influence of the heat. Various fluxing agents may be employed in lieu of borax but this substance has been found to give the best results at the lowest concentration thereof. However, calcium hydroxide, sodium carbonate and potassium nitrate may also be employed with advantageous results. The amount of fluxing agent employed will necessarily depend upon the materials used, but from an economic standpoint, the proportion of such agent should be maintained at approximately ½ to 1% by weight of the total admixture.

The relative proportions of bentonite and volcanic ash employed with a specified clay, shale or slag will necessarily vary with the circumstances, but it has been determined that the amount of bentonite should be within the range of ½ to 5 percent by weight of the total dry admixture, while the quantity of volcanic ash or similar materials should be within the range of approximately 1 to 10 percent by weight of the entire dry admixture. The best results, however, are obtained when the bentonite is maintained within a range of 2 to 3 percent by weight of the entire dry admixture while the pumicite or volcanic ash is kept within the range of 4 to 6 percent by weight of the dry materials employed. The building unit must contain a sufficient amount of the bentonite and volcanic ash to permanently bond all of the larger particles of aggregate together, and there must also be sufficient bentonite in the initial admixture to present a tacky cohesive mass when water is added thereto prior to molding. As previously set forth, the fines of the aggregate also tend to sinter during the firing process and thus bond the larger particles of aggregate together, but manifestly, the proportion of aggregate fines must be kept within a certain range so that the complete unit will have the necessary compressive strength characteristics. The limits of bentonite and volcanic ash which are specified are dictated not only by commercial factors relating to the overall cost of the unit, but also must be kept within such ranges to prevent the sintered bentonite and volcanic ash from lowering the compressive strength of the block after firing.

If desired, a liquid glaze may be applied to any or all faces of the building unit after the same has been dried and before the unit is placed on the kiln carts for passage through the kiln, and firing of the glaze is effected during sintering of the bentonite and volcanic ash. This process allows glazing of the blocks in a single firing operation and materially lessens the overall cost of producing glazed blocks, as well as making it possible to put a completely waterproof, vitreous surface on the block without subsequent glazing procedures being necessary. Various glazing substances which are well known in the art may be utilized, the only specification that must be observed being the firing temperature at which the block is heated. The glazing composition manifestly should be one that fires at approximately the same temperature at which the bentonite and volcanic ash sinter and to which the block is subjected within the kiln.

If a building unit of high insulating value rather than structural strength characteristics is desired, such a block may be readily produced by utilizing an aggregate having a higher fusion point than the bentonite and the volcanic ash and which is highly vesicular in nature so as to present suitable insulating properties, while structural strength is thereby sacrificed. Thus, vermiculite has been found to be a suitable substance which will produce insulating blocks that are very lightweight and yet will not warp or shrink during firing, and have a low coefficient of expansion. These blocks do not have the compressive strength properties of the units previously described, but are of utility in insulation of buildings, heating equipment, and similar uses.

Although the present process has been particularly described as involving initially admixing all of the dry ingredients before water is added thereto for subsequent molding, the water may be added to the bentonite and volcanic ash bonding fraction prior to introduction of this fraction into the particles of aggregate if desired but, from an operational standpoint, the most practical method is to thoroughly admix all of the dry ingredients before introduction of the water. Various modifications such as this may be made to the present invention without departing from the spirit thereof, but it is intended to be limited only by the scope of the appended claims.

Having thus described the invention what is claimed as new and desired to be secured by Letters Patent is:

1. The method of producing a ceramic building unit having high strength to weight characteristics comprising the steps of admixing approximately two parts by weight of bentonite capable of swelling in the presence of water, approximately four parts by weight of pumicite and approximately ninety-four parts by weight of particulate scoria; introducing approximately ten parts by weight of water calculated on the basis of the total weight of the dry admixture into the latter to form a moist mass suitable for molding; molding the moist mass into a building unit; drying the molded unit at approximately 400° F. for about 10 hours; and firing the unit within approximately a 13 hour cycle, the maximum temperature during said cycle being about 1975° F.

2. The method of producing a ceramic building unit having high strength to weight characteristics comprising the steps of admixing swelling bentonite, a pre-fired, finely divided, vesicular volcanic material and a particulate ceramic aggregate in the presence of sufficient water to produce a tacky mass, said aggregate being selected from the group consisting of pre-fired and bloated clays, shales, slags and volcanic rocks, said aggregate having a higher fusion point than the bentonite and said material, said bentonite constituting from approximately ½ to about 5 percent by weight of the total dry admixture, the volcanic material constituting from approximately 2 to about 10 percent by weight of the total dry admixture and the aggregate constituting substantially the remaining portion of said total admixture; forming the tacky admixture into a building unit; and firing the unit at a temperature sufficient to sinter only the bentonite and material to thereby effect permanent bonding of the particles of aggregate.

3. The method of producing a ceramic building unit having high strength to weight characteristics comprising the steps of admixing swelling bentonite, a pre-fired, finely divided, vesicular volcanic material and a particulate ceramic aggregate in the presence of sufficient water to produce a tacky mass, said aggregate being selected from the group consisting of pre-fired and bloated clays, shales, slags and volcanic rocks, said aggregate having a higher fusion point than the bentonite and said material, and said material having a fusion point intermediate the fusion points of said bentonite and the aggregate, said bentonite constituting from approximately ½ to about 5 percent by weight of the total dry admixture and the volcanic material constituting from approximately 2 to about 10 percent by weight of the total dry admixture and the aggregate constituting substantially the remaining portion of said total admixture; forming the tacky admixture into a building unit; and firing the unit at a temperature sufficient to sinter only the bentonite and material to thereby effect permanent bonding of the particles of aggregate.

4. The method of producing a ceramic building unit having high strength to weight characteristics comprising the steps of admixing bentonite capable of swelling in the presence of water, pre-fired, finely divided, vesicular volcanic material, a particulate ceramic aggregate selected from the group consisting of pre-fired, bloated clays, shales, slags and volcanic rocks, and only a sufficient quantity of water to form a moist, moldable, tacky admixture, said aggregate having a higher fusion point than the bentonite and said material, said bentonite constituting from approximately ½ to about 5 parts by weight of the total dry admixture and the volcanic material constituting from approximately 2 to about 10 parts by weight of the total dry admixture and the aggregate constituting substantially the remaining portion of said total admixture; forming the tacky admixture into a building unit; drying the unit at a temperature below the fusion points of said bentonite and the material; and firing the unit at a temperature sufficient to sinter only the bentonite and material to thereby effect permanent bonding of the particles of aggregate.

5. A method as set forth in claim 4 wherein said material is pumicite.

6. A method as set forth in claim 4 wherein said material is pumice.

7. A method as set forth in claim 4 wherein the amount of material is approximately twice the proportion of bentonite calculated as percent by weight of the initially dry substances in said admixture.

8. A method as set forth in claim 4 wherein from approximately ½ to about 1 percent by weight of a fluxing agent is added to said admixture to lower the fusion point of the bentonite and material.

9. A method as set forth in claim 4 wherein from approximately 0.1 to about 0.2 percent by weight of a plasticizing agent is added to the admixture to prevent cracking of the unit during forming of the same.

10. A method as set forth in claim 9 wherein a liquid glaze is applied to at least one of the external surfaces of the unit after drying thereof and prior to said firing.

11. A fired ceramic building unit having high strength to weight characteristics consisting essentially of a rigid, formed admixture of sintered, swelling bentonite, sintered pre-fired, finely divided, vesicular volcanic material and a particulate ceramic aggregate having a higher fusion point than the bentonite and said material and selected from the group consisting of pre-fired, bloated clays, shales, slags and volcanic rocks, the bentonite constituting from approximately ½ to about 5 percent by weight of the total admixture and the volcanic material constituting from approximately 2 to about 10 percent by weight of the total admixture and the aggregate constituting substantially the remaining portion of said total admixture, the particles of aggregate being permanently bonded together by said sintered bentonite and material to present a composite unit.

12. A fired ceramic building unit having high strength to weight characteristics consisting essentially of a rigid, formed admixture of sintered, swelling bentonite, sintered pumicite and a particulate ceramic aggregate having a higher fusion point than the bentonite and said pumicite and selected from the group consisting of pre-fired, bloated clays, shales, slags and volcanic rocks, the bentonite constituting from approximately ½ to about 5 percent by weight of the total admixture and the pumicite constituting from approximately 2 to about 10 percent by weight of the total admixture and the aggregate constituting substantially the remaining portion of said total admixture, the particles of aggregate being permanently bonded together by said sintered bentonite and pumicite to present a composite unit.

References Cited in the file of this patent

UNITED STATES PATENTS

| | | |
|---|---|---|
| 2,198,990 | Cummins | Apr. 30, 1940 |
| 2,498,355 | Bomgren | Feb. 21, 1950 |